United States Patent
Karve et al.

(10) Patent No.: US 9,361,595 B2
(45) Date of Patent: Jun. 7, 2016

(54) ON-DEMAND CLOUD SERVICE MANAGEMENT

(71) Applicant: International Business Machines Corporation, Armonk, NY (US)

(72) Inventors: Alexei Karve, Mohegan Lake, NY (US); Ajay Mohindra, Yorktown Heights, NY (US); Anca Sailer, Scarsdale, NY (US); Alla Segal, Mount Kisco, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 184 days.

(21) Appl. No.: 13/716,081

(22) Filed: Dec. 14, 2012

(65) Prior Publication Data
US 2014/0172491 A1    Jun. 19, 2014

(51) Int. Cl.
G06F 3/00      (2006.01)
G06Q 10/06    (2012.01)

(52) U.S. Cl.
CPC .............................. G06Q 10/06315 (2013.01)

(58) Field of Classification Search
None
See application file for complete search history.

(56) References Cited

U.S. PATENT DOCUMENTS

| 6,289,382 B1* | 9/2001 | Bowman-Amuah | 709/226 |
|---|---|---|---|
| 6,339,832 B1* | 1/2002 | Bowman-Amuah | 714/35 |
| 6,842,906 B1* | 1/2005 | Bowman-Amuah | 719/330 |
| 7,289,964 B1* | 10/2007 | Bowman-Amuah | 705/1.1 |
| 8,429,630 B2* | 4/2013 | Nickolov et al. | 717/148 |
| 8,544,095 B2* | 9/2013 | Mahaffey et al. | 726/23 |
| 8,615,581 B2* | 12/2013 | Dare et al. | 709/224 |
| 8,650,290 B2* | 2/2014 | Dare et al. | 709/224 |
| 8,745,739 B2* | 6/2014 | Mahaffey et al. | 726/22 |
| 8,752,176 B2* | 6/2014 | Mahaffey et al. | 726/23 |
| 2003/0058277 A1* | 3/2003 | Bowman-Amuah | 345/765 |
| 2009/0276771 A1* | 11/2009 | Nickolov et al. | 717/177 |
| 2011/0047540 A1* | 2/2011 | Williams et al. | 717/178 |
| 2012/0032945 A1* | 2/2012 | Dare et al. | 345/418 |
| 2012/0036220 A1* | 2/2012 | Dare et al. | 709/217 |
| 2012/0036245 A1* | 2/2012 | Dare et al. | 709/223 |
| 2012/0036440 A1* | 2/2012 | Dare et al. | 715/734 |
| 2012/0069131 A1* | 3/2012 | Abelow | 348/14.01 |
| 2012/0110174 A1* | 5/2012 | Wootton et al. | 709/224 |
| 2012/0185913 A1* | 7/2012 | Martinez et al. | 726/1 |
| 2013/0151314 A1* | 6/2013 | Kugler et al. | 705/7.32 |

OTHER PUBLICATIONS

A Vouk, Mladen. "Cloud computing—issues, research and implementations."CIT. Journal of Computing and Information Technology 16.4 (2008): 235-246.*

Keahey, Kate, et al. "Virtual workspaces for scientific applications." Journal of Physics: Conference Series. vol. 78. No. 1. IOP Publishing, 2007.*

(Continued)

*Primary Examiner* — Gurkanwaljit Singh
(74) *Attorney, Agent, or Firm* — Louis J. Percello; Otterstedt, Ellenbogen & Kammer, LLP

(57) ABSTRACT

A plurality of traditional software applications are packaged as custom composite solutions, and are stored as custom composite solution deployable images. Customer input is obtained from a customer. At least one of the custom composite solution deployable images is deployed into a management cloud in response to the customer input.

26 Claims, 5 Drawing Sheets

(56) References Cited

OTHER PUBLICATIONS

Keahey, Katarzyna, and Tim Freeman. "Contextualization: Providing one-click virtual clusters." eScience, 2008. eScience'08. IEEE Fourth International Conference on. IEEE, 2008.*

Unpublished U.S. Appl. No. 13/184,659, Takayuki Kushida et al., filed Jul. 18, 2011.

Peter Mell & Tim Grance, "The NIST Definition of Cloud Computing" Version 15, Oct. 7, 2009, National Institute of Standards and Technology, Information Technology Laboratory.

T. Chieu, A. Karve, A. Mohindra, and A. Segal, "Simplifying solution deployment on a Cloud through composite appliances," IEEE IPDPSW 2010, Apr. 19, 2010, Atlanta, GA.

T. Chieu, A. Mohindra, A. Karve, and A. Segal, "Solution-based Deployment of Complex Application Services on a Cloud," IEEE SOLI 2010, Jul. 15, 2010, Qingdao, China.

T. Chieu, A. Mohindra, A. Karve, and A. Segal, "Dynamic Scaling of Web Applications in a Virtualized Cloud Computing Environment," IEEE ICEBE 2009, Macau, China, Oct. 21, 2009.

* cited by examiner

US 9,361,595 B2

ON-DEMAND CLOUD SERVICE MANAGEMENT

FIELD OF THE INVENTION

The present invention relates to the electrical, electronic and computer arts, and, more particularly, to cloud computing and the like.

BACKGROUND OF THE INVENTION

Traditional "in-house" design, development, and delivery of information technology (IT) services, which used to be the norm in the majority of large enterprises, is now typically limited to business-critical operations. Specialized service providers are now commonly utilized for processes such as asset and service support management. This change has led to significant productivity improvements, changed the role of enterprise IT personnel, and also triggered the emergence of entirely new business models for the IT service provider. The economies of scale enabled by IT cloud solutions allow specialized providers to become much more efficient at particular tasks, while providing best-of-breed services. However, providers of uni-tenant products and tools still deliver asset and service support management services as options of the main business service solution, primarily leveraging computational resources available in the data center where the business service is provisioned from.

SUMMARY OF THE INVENTION

Principles of the invention provide techniques for on-demand cloud service management. In one aspect, an exemplary method includes the steps of packaging a plurality of traditional software applications as custom composite solutions; storing the custom composite solutions as custom composite solution deployable images; obtaining customer input from a customer; and deploying at least one of the custom composite solution deployable images into a management cloud in response to the customer input.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide one or more of the following advantages:

separation of business dedicated resources management from service supports resources management;
reusability of existing assets, knowledge and expertise;
human IT resource balance between current customers and product upgrade and development;

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
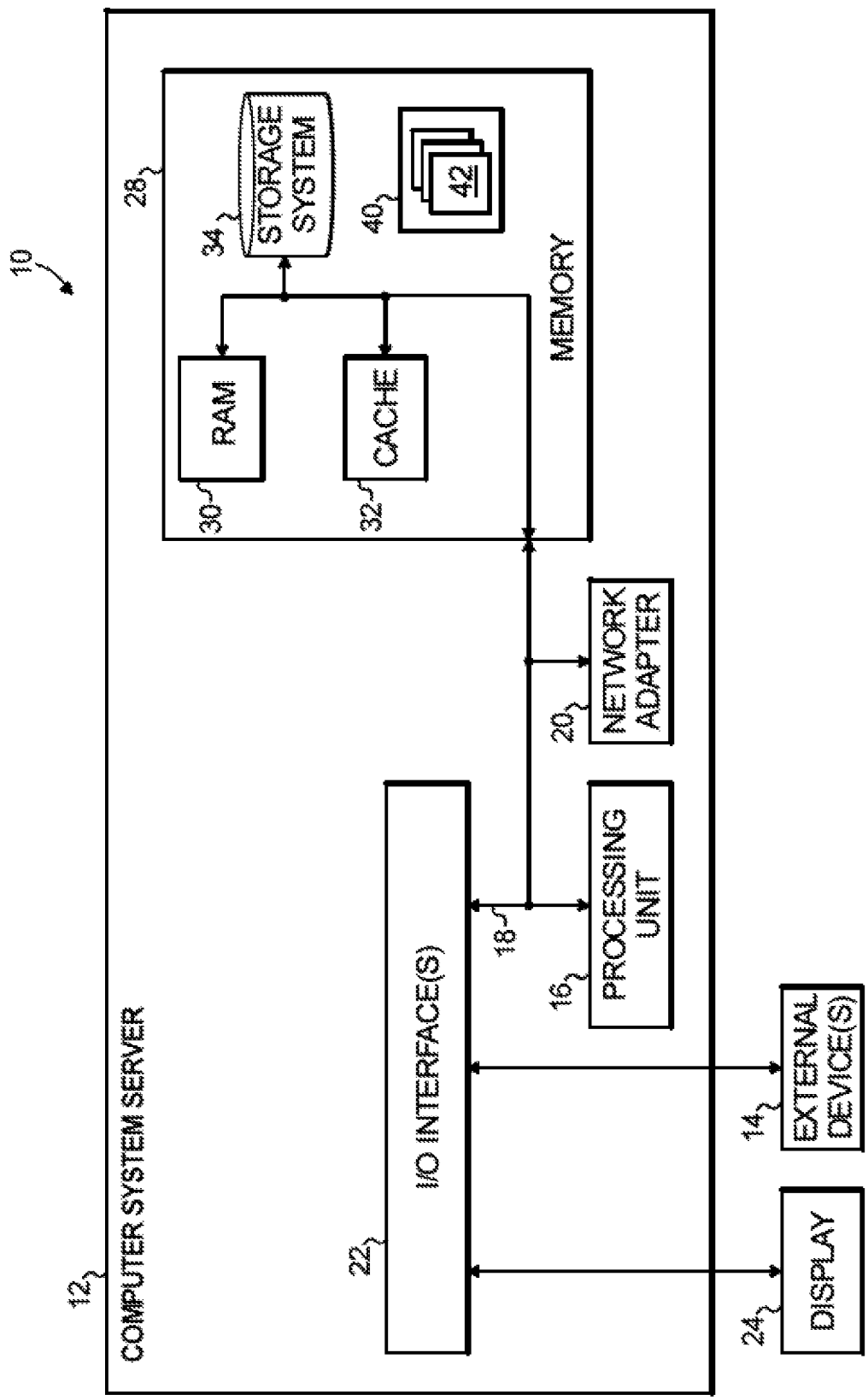
FIG. 1 depicts a cloud computing node according to an embodiment of the present invention.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth herein.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
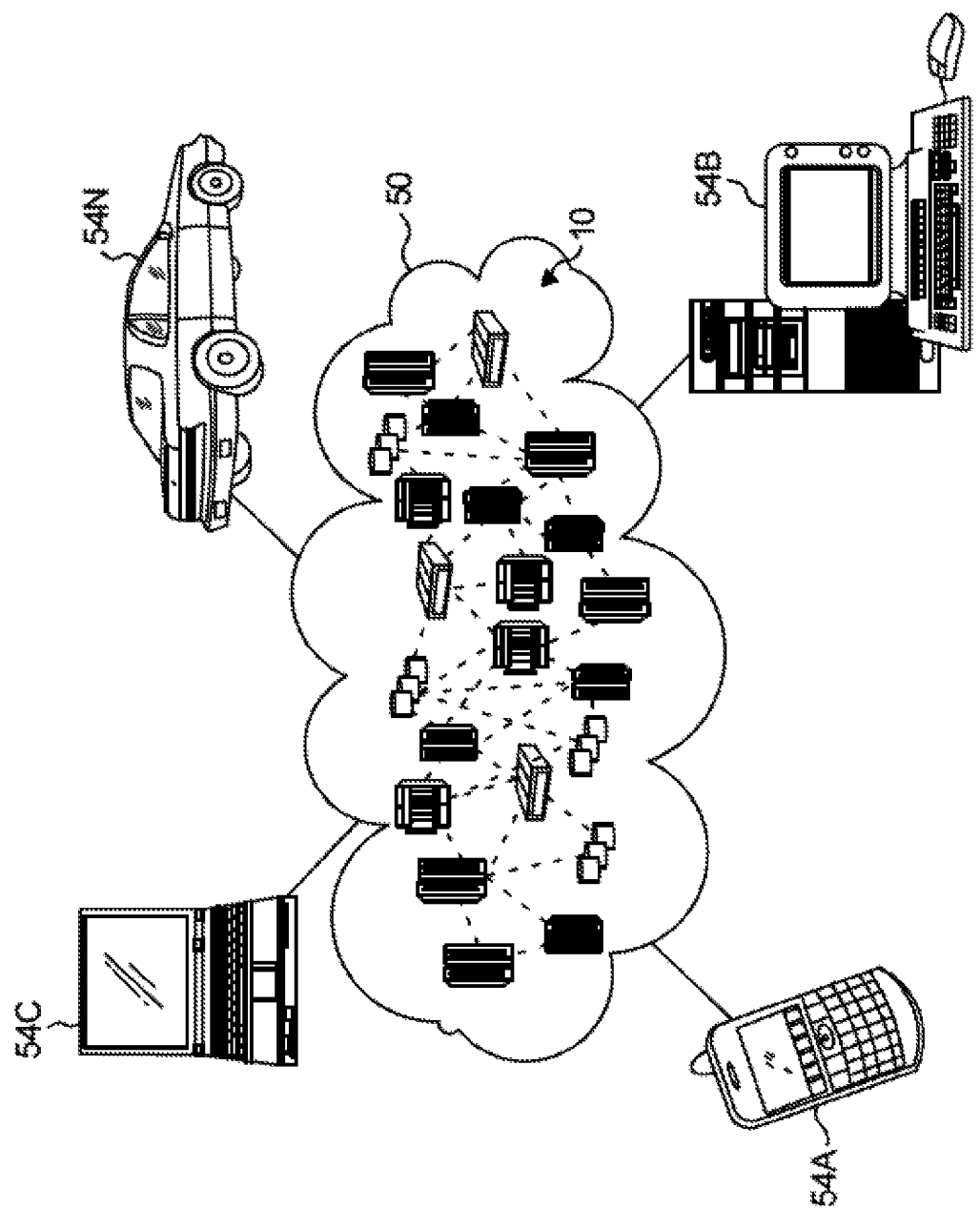
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
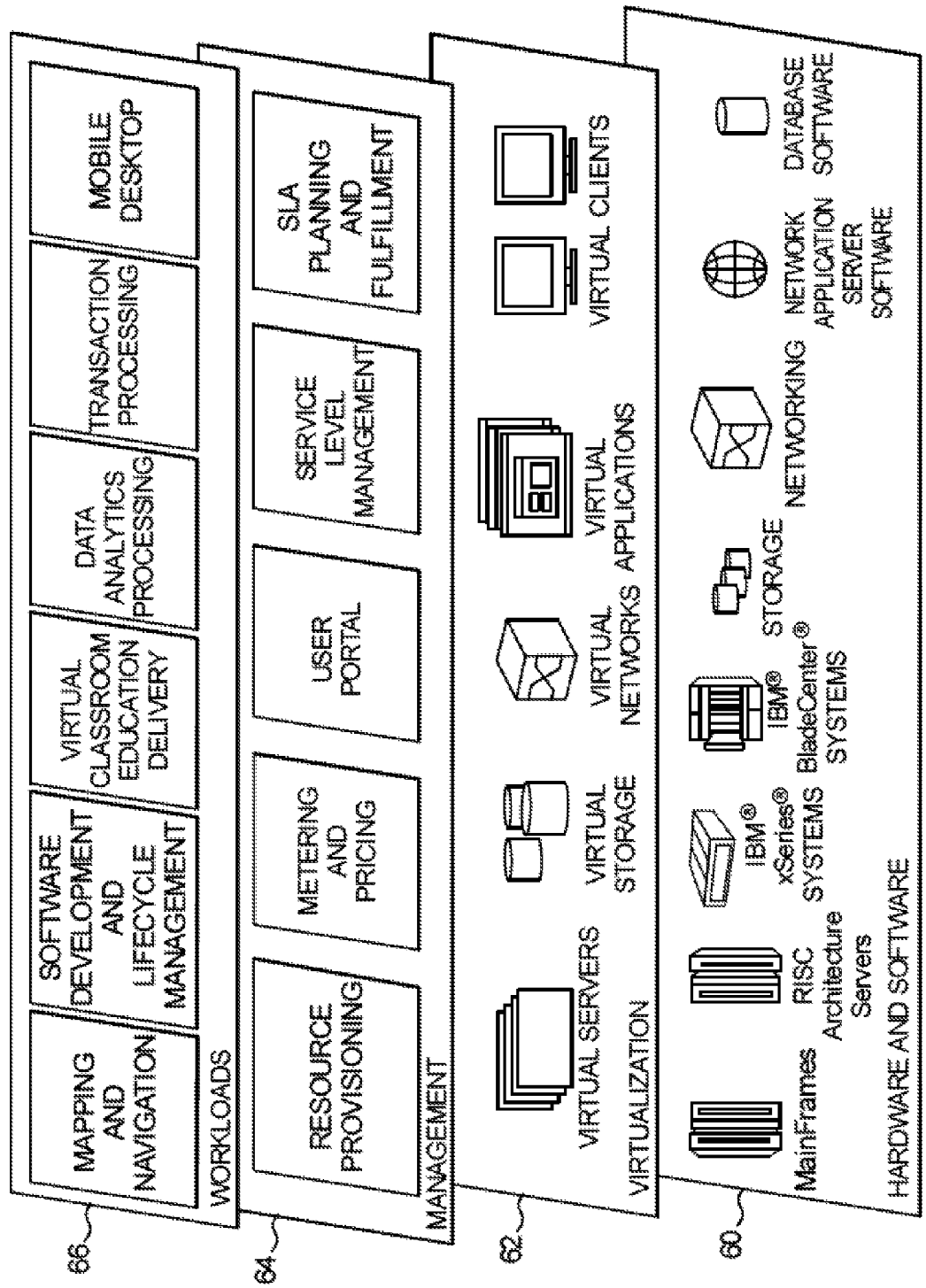
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2®, database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

The cost of service management typically represents a substantial part of operational costs; thus, faster, more effective service delivery and support can contribute to a substantial reduction in administration costs. Service support includes the processes of detecting anomalies in a monitored system, locating the problems responsible for the issue, determining the cause, and fixing the problem through incident or change management.

As noted above, traditional "in-house" design, development, and delivery of information technology (IT) services, which used to be the norm in the majority of large enterprises, is now typically limited to business-critical operations. Specialized service providers are now commonly utilized for processes such as asset and service support management. This change has led to significant productivity improvements, changed the role of enterprise IT personnel, and also triggered the emergence of entirely new business models for the IT service provider. The economies of scale enabled by IT cloud solutions allow specialized providers to become much more efficient at particular tasks, while providing best-of-breed services. However, providers of uni-tenant products and tools still deliver asset and service support management services as options of the main business service solution, primarily leveraging computational resources available in the data center where the business service is provisioned from.

To preserve the benefits of cloud computing, such providers and vendors may aim to transform their portfolios of uni-tenant products into multi-tenant versions. This transformation process is both costly and labor intensive, since it involves heavy software redesign.

One or more embodiments advantageously provide a solution to offer cloud efficient asset and service support management by custom packaging traditional products and tools, as composite solutions, into images deployable for each customer on a dedicated maintenance and support Cloud, while allowing for a smooth transition towards upgraded products and tools.

One or more embodiments provide a set of techniques and processes to:
1. Package traditional existing tools and products as custom composite solutions;
2. Create and store the solutions as deployable images;
3. At customer service deployment time, match and deploy appropriate asset or Maintenance and Technical Support (MTS) images from an image repository (one or more embodiments employ standardized, supported images);
4. Build a dedicated MTS cloud and leverage current knowledge and expertise;
5. Enable a marketplace for third party plug-in solutions in areas of expertise that are new or overloaded; and/or
6. Provide data management applications and application program interfaces (APIs) with role based access and differentiated privacy data interpretation and representation.

As noted, advantageously, one or more embodiments provide separation of business dedicated resources management from service support resources management; provide reusability of existing assets, knowledge and expertise; and/or provide human IT resource balance between current customers and product upgrade and development.

Figure 4:
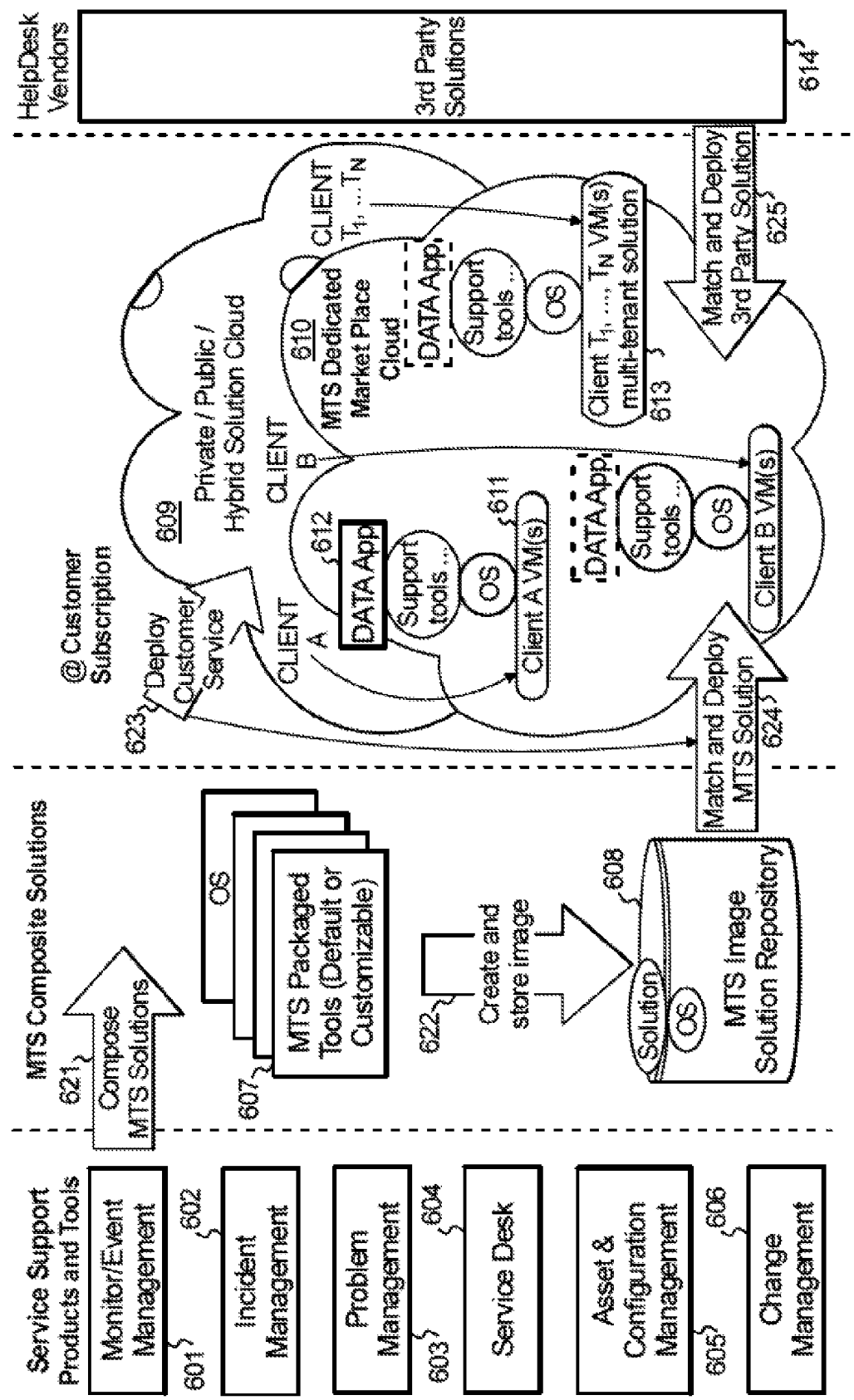
FIG. 4 presents an exemplary combined flow chart and block diagram, according to an aspect of the invention.

Reference should now be had to FIG. 4, which depicts an exemplary system and methodology, according to an aspect of the invention. More particularly, FIG. 4 depicts an exemplary system and methodology for asset and service support management provided from a dedicated cloud as a market place. It will be appreciated that FIG. 4 shows a non-limiting example of a system and method for on-demand cloud service management.

Elements 601-606 are non-limiting examples of service support products and tools. Note monitoring and event management product and/or tool 601; incident and problem management products and/or tools 602, 603 respectively; service desk 604; asset and configuration management product and/or tool 605; and change management product and/or tool 606. Other embodiments could include different sets of products and or tools such as additional products and/or tools not shown in FIG. 4; and/or could omit some or all of the products and/or tools shown in FIG. 4.

Process 621 includes composition of MTS solutions 607. As used herein, a composite appliance, specified using a descriptor file, is a collection of individual appliance images that are pre-architected to work together with configuration parameters. The images can be preloaded with application software. The configuration points and integration steps are identified and captured into the artifacts. The solution deployment includes a replicable process with fix-up scripts for image-based provisioning. Reference is made to the following technical papers, each of which is incorporated herein by reference in its entirety for all purposes:
  T. Chieu, A. Karve, A. Mohindra, and A. Segal, "Simplifying solution deployment on a Cloud through composite appliances," IEEE IPDPSW 2010, Apr. 19, 2010, Atlanta, Ga.
  T. Chieu, A. Mohindra, A. Karve, and A. Segal, "Solution-based Deployment of Complex Application Services on a Cloud," IEEE SOLI 2010, Jul. 15, 2010, Qingdao, China
  T. Chieu, A. Mohindra, A. Karve, and A. Segal, "Dynamic Scaling of Web Applications in a Virtualized Cloud Computing Environment," IEEE ICEBE 2009, Macau, China, Oct. 21, 2009

Figure 5:
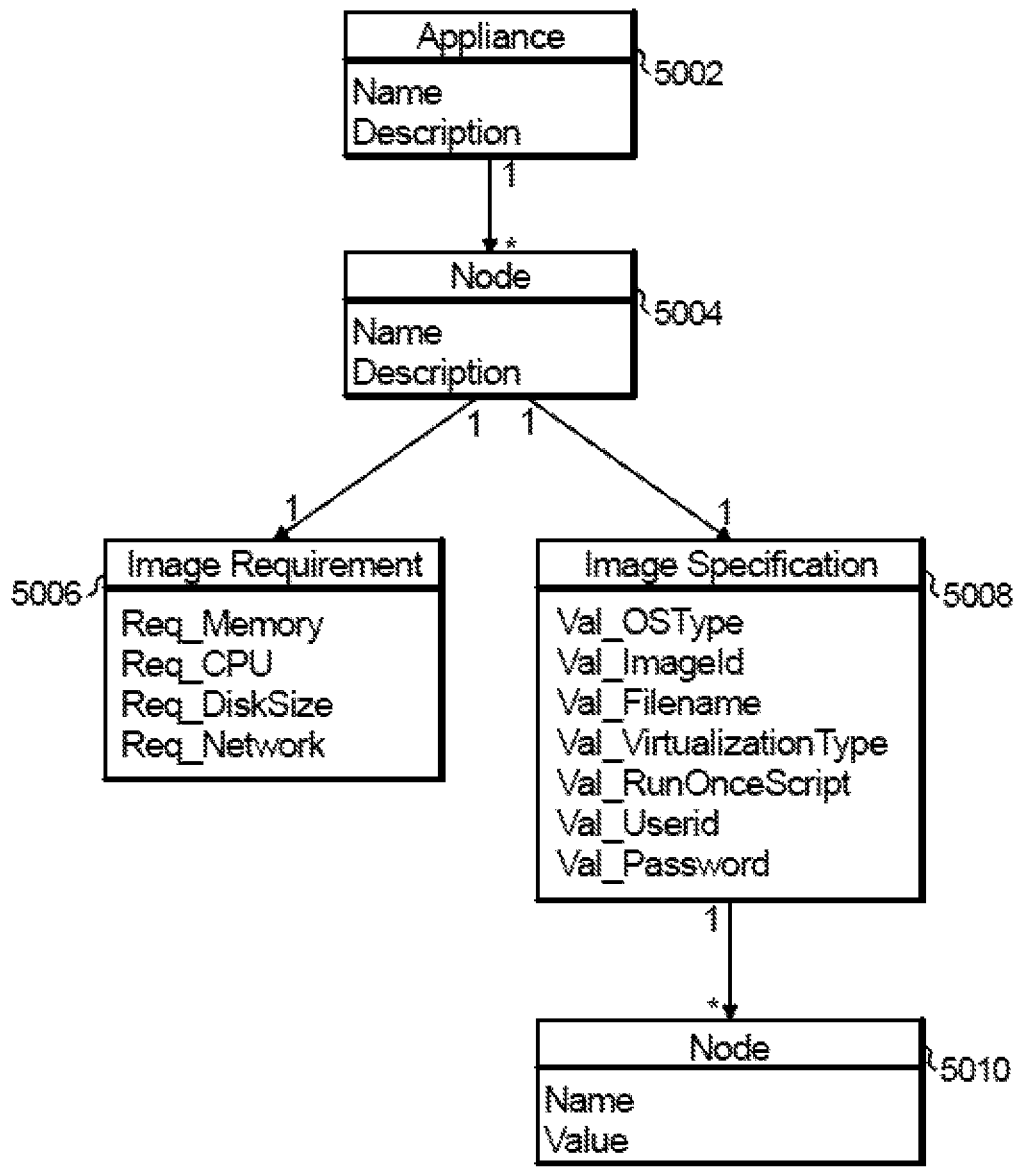
FIG. 5 is schema diagram for a composite appliance useful in at least some aspects of the invention.

Furthermore, with regard to a composite appliance, in some instances, an exemplary cloud provisioning system enables system administrators to specify a solution's requirements and deployment topology using an XML file or the like. A Composite Appliance is a collection of individual appliance images that are pre-architected to work together with simple configuration parameters. The configuration points and integration steps are identified and captured into artifacts, and the solution deployment then becomes a simple and replicable process with image-based provisioning. In some embodiments, a Composite Appliance is specified using an XML descriptor file. FIG. 5 shows the schema diagram for specifying a solution requirements and topology of a Composite Appliance. The top-level class for the specification is an <appliance> section 5002. Each <appliance> section includes one or more <node> sections 5004. Further, each <node> section includes an <image-requirement> section 5006 and an <image-specification> section 5008. The <node> section corresponds to one logical node of the solution. The <image-requirement> section specifies the system memory, CPU, disk size and network requirements of the image associated with the solution.

This approach allows a system administrator to quickly configure and deploy similar solutions with different requirements by simply changing the values in the specification. The <image-specification> section contains information about the image that is part of the solution. The information is used by the provisioning system at the time of deployment of the solution. Each appliance image may contain a preconfigured software stack. The values correspond to the following attributes:
  OSType—Descriptive name of the Operating System name and version installed on the image
  ImageId—Identifier of the image in the image library
  Filename—File name of the image
  VirtualizationType—Type of virtualization technology needed for this image
  RunOnceScript—A semi-colon (;) separated string of commands that are executed when the newly-created virtual machine from the image is first started.
  Userid—Specifies the "Userid" with root/administrator privileges for the new virtual machine
  Password—Specifies the password that needs to be set for the "Userid" with root/administrator privileges.

Each <image-specification> section also contains multiple Software Attributes 5010. The Software Attributes include the name-value pairs describing the attributes associated with the software stack that is configured on the specific image. For example, in an image that has the DB2 Server software installed, the Software Attributes section would contain the "db2port," "db2installationpath," "db2userid," and "db2password" information. Since an image may be authored by different developers, this information provides system administrators with information about the image so that they can provide scripts to change the configuration as needed.

Returning now to FIG. 4, process 622 includes using the MTS solutions 607 to build images. The composite appliances or solutions, once built as images, are stored in MTS image solution repository 608. These images are ready to be used to provision a service management environment for each customer.

The service management environment is provisioned and customized in a management cloud 610 on top of an existing public cloud 609. Non-limiting examples of such a public cloud include the IBM SmartCloud Enterprise (SCE) enterprise-class public cloud infrastructure-as-a-service (IaaS) available from International Business Machines Corporation and the AMAZON ELASTIC COMPUTE CLOUD (Amazon EC2) available from Amazon Web Services LLC. The management cloud 610 provisions a set of management virtual machines (VMs) 611 and 613, hosting the composite appliances for customers. The composite appliances may include, for example, IBM TIVOLI PROVISIONING MANAGER software (TPM), IBM TIVOLI MONITORING SOFTWARE (ITM), and the like, available from International Business Machines Corporation, Armonk, N.Y., USA. In one or more embodiments, these VMs are either, as for VM 611, dedicated to a specific tenant and/or customer in case of single-tenant tools, or, as for VM 613, shared among multiple customers in case of multi-tenant solutions. The management cloud 610 provides management functionality as required by the customer, ranging from full end-to-end management of the VMs and applications of the tenants, to, in some cases, merely asset management or a service desk. Each tenant will have a set of "admin" users that can manage that tenant's customers. The admin users are provided data management APIs or tools 612 to control and interact with the data generated by the management environment.

When customers subscribe to services in the services catalog in process 623, the option to additionally subscribe to management services (such as, but not limited to, monitoring and event management, incident and problem management, asset, configuration and change management, and the like) is offered to them.

Process 624 locates and deploys the images required by composite appliance provisioning as well as additional software packages and images required by the solution and/or chosen by the customer as in process 623. In one or more embodiments, process 624 provides the following functionality:

1. Examines the metadata for the composite solution, and the customer requirements, in order to determine which images and which additional services need to be provisioned.
2. Determines if all pre-requisites for the composite solution and additional services are included in the images corresponding to the services and/or exist in the IT infrastructure already provisioned for the customer and can be shared, and determines if any of the additional services need to be provisioned.
3. Locates the images in the database 608 and deploys them into the management cloud 610; deploys images corresponding to the solution's prerequisites if necessary.
4. Determines whether any additional software was chosen in process 623 and deploys any such software on the images.
5. Determines additional services that are required based on customer's selections, customer's policies stored in the database 608 (e.g., a customer may have a requirement to always add a monitoring service), and/or requirements.
6. After images are provisioned, performs configuration to ensure that all images work together.

Additionally, the image location and deployment can, in some instances, be provided as well from third party vendors 614. This is shown in process 625. In one or more embodiments, if the customer requires an application that does not exist in the MTS image repository, the service leverages third party providers to install it.

Given the discussion thus far, and with continued reference to FIG. 4, it will be appreciated that, in general terms, and exemplary method, according to an aspect of the invention, includes the step 621 of packaging a plurality of traditional software applications (e.g., 601-606) as custom composite solutions 607. Step 621 can be carried out, for example, by a human expert. A further step 622 includes storing the custom composite solutions as custom composite solution deployable images 608. Step 622 can be carried out, for example, via an image creation sub-module 622 of an image repository module 608 associated with a cloud environment. A still further step 623 includes obtaining customer input (typically technical information) from a customer, and an even further step 624 includes deploying at least one of the custom composite solution deployable images into a management cloud 610 in response to the customer input. Step 623 can be carried out, for example via a telephone call, e-mail, graphical user interface, or any other suitable communication technique, and can be facilitated via a suitable communications network. Step 624 can be carried out, for example, via an image deployment sub-module 624 of an image repository module 608 associated with a cloud environment.

In some instances, an additional step includes providing, to an administrative user of the customer, at least one data management mechanism to interact with data generated by the custom composite solution deployable image(s) deployed into the management cloud. The mechanism could include, for example, an API and/or a data management tool as discussed elsewhere herein.

In some embodiments, a further step 625 includes deploying at least one third party deployable image (e.g., corresponding to one or more of the third party solutions 614) into the management cloud 610 in response to the customer input.

In some instances, the management cloud may be a pre-existing cloud that is updated as described herein; in other instances, a further step includes building the management cloud.

In some cases, in the packaging step, the plurality of traditional software applications include two or more of elements 601-606.

In some embodiments, deploying step 624 includes examining metadata for at least a corresponding one of the composite solutions 607 (i.e., the one or more solutions corresponding to the images that are going to be deployed), and the customer input obtained in step 623. This is done in order to determine which of the deployable images, and optionally which additional services (if any), need to be provisioned (additional services are not always needed; typically only if the customer takes an "a la carte" approach and adds the additional services on top of the "out-of-the-box" solution). Deploying step 624 further includes determining whether all pre-requisites for the corresponding one of the composite solutions and the additional services (if any) are included in the custom composite solution deployable image(s) to be utilized, and/or exist in an information technology infrastructure (e.g., private/hybrid cloud 609) already provisioned for the customer, and can be shared. Deploying step 624 includes locating any of the custom composite solution deployable image(s) that need to be provisioned in database 608. In the case of additional services, deploying step 624 still further includes determining whether any of the additional services need to be provisioned; and deploying additional services deployable images corresponding to any additional services that need to be provisioned. In this regard, it is worth noting that any image, if properly generated, should be deployable; as noted, in some instances, there can be third party images as well, as per 614 and 625.

In some instances, the deploying step even further includes deploying images corresponding to required prerequisites for any of the custom composite solution(s) 607 corresponding to the custom composite solution deployable images(s) that are being utilized.

In some instances, the deploying step yet further includes performing configuration to ensure that all the pertinent images (e.g., the custom composite solution deployable image(s) being utilized, the images corresponding to any required prerequisites, and the additional service deployable images) all work together.

Optionally, the deploying step further involves determining whether any additional software was chosen in process 623 and deploying any such software on the images utilized in the solution, and/or determining additional services that are required based on the customer's selections, customer's policies stored in the database 608 (e.g., a customer may have a requirement to always add a monitoring service), and/or requirements.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. With reference to FIG. 1, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 1) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. In the most general case, the program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). However, one or more embodiments are particularly significant in the context of a cloud or virtual machine environment. Reference is made back to FIGS. 1-3 and accompanying text.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks in the figures; e.g., an image repository module 608 associated with a cloud environment and having an image creation sub-module 622 and an image deployment sub-module 624. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
packaging a plurality of traditional maintenance and technical support software applications as custom maintenance and technical support composite solutions;
storing said custom maintenance and technical support composite solutions as custom maintenance and technical support composite solution deployable images, wherein a given one of the custom maintenance and technical support composite solution deployable images comprises a collection of individual appliance images that are pre-architected to work together with configuration parameters that have been identified and captured into artifacts, and wherein each of the individual appliance images comprises a preconfigured software stack;

obtaining customer input from a customer;

deploying at least one of said custom maintenance and technical support composite solution deployable images into a management cloud in response to said customer input, said management cloud being formed on top of an existing public cloud to form a hybrid cloud; and managing a plurality of customer services of said customer, which are deployed in said existing public cloud, with said at least one of said custom maintenance and technical support composite solution deployable images that has been deployed into said management cloud, by executing said at least one of said custom maintenance and technical support composite solution deployable images on at least one virtual machine in said management cloud.

2. The method of claim 1, further comprising providing to an administrative user of said customer at least one data management mechanism to interact with data generated by said at least one of said custom maintenance and technical support composite solution deployable images deployed into said management cloud.

3. The method of claim 1, further comprising deploying at least one third party deployable image into the management cloud in response to said customer input.

4. The method of claim 1, further comprising building said management cloud.

5. The method of claim 1, wherein, in said packaging step, said plurality of traditional maintenance and technical support software applications comprise at least two of:
a monitoring and event management application;
an incident and problem management application;
a service desk;
an asset and configuration management product application; and
a change management application.

6. The method of claim 1, wherein said deploying step comprises:
examining metadata for at least a corresponding one of said maintenance and technical support composite solutions, and said customer input, in order to determine which of said custom maintenance and technical support composite solution deployable images need to be provisioned;
determining whether all pre-requisites for said at least said corresponding one of said maintenance and technical support composite solutions are at least one of:
included in said at least one of said custom maintenance and technical support composite solution deployable images; and
exist in an information technology infrastructure already provisioned for said customer, and can be shared; and
locating those of said custom maintenance and technical support composite solution deployable images that need to be provisioned in a database.

7. The method of claim 6, wherein:
said examining further comprises examining said metadata for at least said corresponding one of said maintenance and technical support composite solutions, and said customer input, in order to determine which additional services need to be provisioned; and
said determining regarding said pre-requisites further comprises determining whether all pre-requisites for said additional services are at least one of:
included in said at least one of said custom maintenance and technical support composite solution deployable images; and
exist in an information technology infrastructure already provisioned for said customer, and can be shared;
further comprising:
determining whether any of said additional services need to be provisioned; and
deploying additional services deployable images corresponding to those additional services that need to be provisioned.

8. The method of claim 7, wherein said deploying step further comprises deploying images corresponding to required prerequisites for at least one of said custom maintenance and technical support composite solutions corresponding to said at least one of said custom maintenance and technical support composite solution deployable images.

9. The method of claim 8, wherein said deploying step further comprises:
performing configuration to ensure that said at least one of said custom maintenance and technical support composite solution deployable images, images corresponding to required prerequisites, and said additional service deployable images all work together.

10. The method of claim 1, further comprising providing a system, wherein the system comprises distinct software modules, each of the distinct software modules being embodied on a computer-readable storage medium, and wherein the distinct software modules comprise an image repository module, an image creation sub-module of said image repository module, and an image deployment sub-module of said image repository module;
wherein:
said storing is carried out by said image creation sub-module executing on at least one hardware processor; and
said deploying is carried out by said image deployment sub-module executing on said at least one hardware processor.

11. A non-transitory computer readable medium comprising computer executable instructions which when executed by a computer cause the computer to perform the method of:
storing custom maintenance and technical support composite solutions as custom maintenance and technical support composite solution deployable images, said custom maintenance and technical support composite solutions comprising packaged pluralities of traditional maintenance and technical support software applications, wherein a given one of the custom maintenance and technical support composite solution deployable images comprises a collection of individual appliance images that are pre-architected to work together with configuration parameters that have been identified and captured into artifacts, and wherein each of the individual appliance images comprises a preconfigured software stack;
deploying at least one of said custom maintenance and technical support composite solution deployable images into a management cloud in response to customer input, said management cloud being formed on top of an existing public cloud to form a hybrid cloud; and
managing a plurality of customer services of said customer, which are deployed in said existing public cloud, with said at least one of said custom maintenance and technical support composite solution deployable images that has been deployed into said management cloud, by executing said at least one of said custom maintenance and technical support composite solution deployable images on at least one virtual machine in said management cloud.

12. The computer readable medium of claim 11, further comprising computer executable instructions which when executed by the computer cause the computer to perform the further method step of providing, to an administrative user of said customer, at least one data management mechanism to interact with data generated by said at least one of said custom maintenance and technical support composite solution deployable images deployed into said management cloud.

13. The computer readable medium of claim 11, further comprising computer executable instructions which when executed by the computer cause the computer to perform the further method step of deploying at least one third party deployable image into the management cloud in response to said customer input.

14. The computer readable medium of claim 11, further comprising computer executable instructions which when executed by the computer cause the computer to perform the further method step of building said management cloud.

15. The computer readable medium of claim 11, wherein said plurality of traditional maintenance and technical support software applications comprise at least two of:
a monitoring and event management application;
an incident and problem management application;
a service desk;
an asset and configuration management product application; and
a change management application.

16. The computer readable medium of claim 11, wherein said computer executable instructions which when executed by the computer cause the computer to perform the method step of deploying further comprise computer executable instructions which when executed by the computer cause the computer to perform the method sub-steps of:
examining metadata for at least a corresponding one of said maintenance and technical support composite solutions, and said customer input, in order to determine which of said custom maintenance and technical support composite solution deployable images need to be provisioned;
determining whether all pre-requisites for said at least said corresponding one of said maintenance and technical support composite solutions are at least one of:
included in said at least one of said custom composite solution deployable images; and
exist in an information technology infrastructure already provisioned for said customer, and can be shared; and
locating those of said custom maintenance and technical support composite solution deployable images that need to be provisioned in a database.

17. The computer readable medium of claim 16, wherein:
said computer executable instructions which when executed by the computer cause the computer to perform the method sub-step of examining further comprise computer executable instructions which when executed by the computer cause the computer to perform the method sub-step of examining said metadata for at least said corresponding one of said maintenance and technical support composite solutions, and said customer input, in order to determine which additional services need to be provisioned; and
said computer executable instructions which when executed by the computer cause the computer to perform the method sub-step of determining further comprise computer executable instructions which when executed by the computer cause the computer to perform the method sub-step of determining whether all pre-requisites for said additional services are at least one of:
included in said at least one of said custom maintenance and technical support composite solution deployable images; and
exist in an information technology infrastructure already provisioned for said customer, and can be shared;
further comprising computer executable instructions which when executed by the computer cause the computer to perform the further method steps of:
determining whether any of said additional services need to be provisioned; and
deploying additional services deployable images corresponding to those additional services that need to be provisioned.

18. The computer readable medium of claim 17, wherein said computer executable instructions which when executed by the computer cause the computer to perform the further method step of deploying further comprise computer executable instructions which when executed by the computer cause the computer to perform the method sub-step of deploying images corresponding to required prerequisites for at least one of said custom maintenance and technical support composite solutions corresponding to said at least one of said custom maintenance and technical support composite solution deployable images.

19. The computer readable medium of claim 18, wherein said computer executable instructions which when executed by the computer cause the computer to perform the further method step of deploying further comprise computer executable instructions which when executed by the computer cause the computer to perform the method sub-step of:
performing configuration to ensure that said at least one of said custom maintenance and technical support composite solution deployable images, images corresponding to required prerequisites, and said additional service deployable images all work together.

20. An apparatus comprising:
a memory; and
at least one processor, coupled to said memory, and operative to:
store custom maintenance and technical support composite solutions as custom maintenance and technical support composite solution deployable images, said custom maintenance and technical support composite solutions comprising packaged pluralities of traditional maintenance and technical support software applications, wherein a given one of the custom maintenance and technical support composite solution deployable images comprises a collection of individual appliance images that are pre-architected to work together with configuration parameters that have been identified and captured into artifacts, and wherein each of the individual appliance images comprises a preconfigured software stack;
deploy at least one of said custom maintenance and technical support composite solution deployable images into a management cloud in response to customer input, said management cloud being formed on top of an existing public cloud to form a hybrid cloud; and
manage a plurality of customer services of said customer, which are deployed in said existing public cloud, with said at least one of said custom maintenance and technical support composite solution deployable images that has been deployed into said management cloud, by executing said at least one of said custom maintenance and technical support composite solution deployable images on at least one virtual machine in said management cloud.

21. The apparatus of claim 20, wherein said at least one processor is further operative to provide, to an administrative user of said customer, at least one data management mechanism to interact with data generated by said at least one of said custom maintenance and technical support composite solution deployable images deployed into said management cloud.

22. The apparatus of claim 20, wherein said at least one processor is further operative to deploy at least one third party deployable image into the management cloud in response to said customer input.

23. The apparatus of claim 20, wherein said at least one processor is further operative to build said management cloud.

24. The apparatus of claim 20, further comprising a plurality of distinct software modules, each of the distinct software modules being embodied on a computer-readable storage medium, and wherein the distinct software modules comprise an image repository module, an image creation sub-module of said image repository module, and an image deployment sub-module of said image repository module;
wherein:
said at least one processor is operative to store by executing said image creation sub-module; and
said at least one processor is operative to deploy by executing said image deployment sub-module.

25. An apparatus comprising:
means for storing custom maintenance and technical support composite solutions as custom maintenance and technical support composite solution deployable images, said custom maintenance and technical support composite solutions comprising packaged pluralities of traditional software applications, wherein a given one of the custom maintenance and technical support composite solution deployable images comprises a collection of individual appliance images that are pre-architected to work together with configuration parameters that have been identified and captured into artifacts, and wherein each of the individual appliance images comprises a preconfigured software stack;
means for deploying at least one of said custom maintenance and technical support composite solution deployable images into a management cloud in response to customer input, said management cloud being formed on top of an existing public cloud to form a hybrid cloud; and
means for managing a plurality of customer services of said customer, which are deployed in said existing public cloud, with said management cloud.

26. The apparatus of claim 25, further comprising:
a memory; and
at least one processor, coupled to said memory; and
a plurality of distinct software modules, each of the distinct software modules being embodied on a computer-readable storage medium;
wherein the distinct software modules comprise an image repository module, an image creation sub-module of said image repository module, and an image deployment sub-module of said image repository module;
wherein said means for storing comprises said at least one processor executing said image creation sub-module; and
wherein said means for deploying comprises said at least one processor executing said image deployment sub-module.

\* \* \* \* \*